United States Patent [19]
Garcia, Jr.

[11] 4,332,238
[45] Jun. 1, 1982

[54] SOLAR TRACKING SYSTEM

[76] Inventor: Raul Garcia, Jr., 6244 S. 41st Ave., Phoenix, Ariz. 85041

[21] Appl. No.: 134,542

[22] Filed: Mar. 27, 1980

[51] Int. Cl.³ .............................................. F24J 3/02
[52] U.S. Cl. .................................. 126/425; 126/424; 126/438; 350/289
[58] Field of Search ...................... 126/424, 425, 438; 353/3; 350/288, 289; 250/203 R

[56] References Cited

U.S. PATENT DOCUMENTS

| | | | |
|---|---|---|---|
| 1,240,890 | 9/1917 | Shuman et al. | 126/425 |
| 1,951,404 | 3/1934 | Goddard | 126/425 |
| 3,305,686 | 2/1967 | Carter et al. | 126/425 X |
| 4,090,498 | 5/1978 | Benson | 126/425 |
| 4,153,038 | 5/1979 | McDonald | 126/425 |
| 4,158,356 | 6/1979 | Wininger | 126/425 |
| 4,192,289 | 3/1980 | Clark | 126/425 |

FOREIGN PATENT DOCUMENTS 2742014  3/1978  Fed. Rep. of Germany ...... 126/425

*Primary Examiner*—Larry Jones
*Attorney, Agent, or Firm*—Herbert E. Haynes, Jr.

[57] ABSTRACT

A solar energy collector and utilization system of the type having a movably mounted collector for reflectively concentrating solar radiation into a focal point that impinges on an energy absorber device is provided with a solar tracking subsystem which includes heat sensor devices that detect movement of the radiation focal point away from the absorber as a result of the diurnal cycle of the sun and upon sensing such movement will enable controlled movements of the collector to be made so that the radiation focal point will be moved back onto the absorber.

4 Claims, 2 Drawing Figures

SOLAR TRACKING SYSTEM

BACKGROUND OF THE INVENTION

1. Field of the Invention

This invention relates generally to solar energy collection systems and more particularly to a new and improved solar tracking system for use therewith.

2. Description of the Prior Art

Despite the great need for a commercially acceptable system for collection and utilization of solar energy, there is no single mechanism, to the best of my knowledge, which satisfactorily fills all the requirements that such a system be a relatively low cost and low maintenance mechanism with high efficiency and dependability.

The prior art is replete with various mechanisms and systems which fall into three basic classes of solar energy collection systems and those classes are sometimes referred to as nontracking systems, single axis tracking systems and two axis tracking systems. Briefly, a nontracking solar collection system is a fixedly mounted structure, normally of planar configuration, which is positioned so that it faces in the general direction of the apparent diurnal path of the sun at an elevation determined by the geographic location. Solar radiation impinging on the surface of the nontracking collector heats a fluid medium, such as air or water, which is continuously passed through the collector. Such nontracking systems are relatively low cost dependable mechanisms due to the absence of a sun tracking capability, however, this same lack of a sun tracking capability places a limitation on the efficiency thereof. Typically, a nontracking solar collector system is capable of collecting about 17%–20% of the available solar radiation and can reach temperatures of between 300°–400° F.

A single axis solar collection system normally includes a solar radiation collector which is equipped to track the sun's apparent azimuthal path and is fixed at an elevation determined by the geographic location. The radiation collector, which is usually a reflecting and concentrating structure, reflectively focuses and concentrates the solar radiation on a solar energy absorber device through which the fluid medium is passed, and the absorber may be a fixedly mounted structure separate from the collector or may be supportingly carried thereon. Typical single axis solar collection systems are said to be capable of collecting about 30%–35% of the available solar radiation and can reach temperatures as high as 500°–600° F. Although significantly more efficient than a nontracking system, single axis systems are inherently more costly, require more maintenance, and are less dependable due to their configuration and the equipment needed to provide the sun tracking capability.

Two axis solar collection systems are similar to single axis systems in that they include a collector for reflecting and concentrating solar radiation on a solar energy absorber. However, as the name implies, two axis systems are equipped to track both the azimuth and elevation of the apparent diurnal cycle of the sun. Two axis solar collection systems are considerably more efficient than either of the other two basic classes of systems, and are reportedly capable of collecting as much as 75%–80% of the available solar radiation and are capable of reaching temperatures in the range of between 1000°–2000° F.

From the foregoing, it will be readily apparent that two axis solar energy collection systems are clearly superior. However, the superior performance of two axis systems, unfortunately, is not the only factor which determines which basic type of system will be selected. Such items as initial and operating costs, maintenance, dependability, and the like must be considered in that those items have had a major influence on the very slow public acceptance of solar energy systems in general and two axis systems in particular.

All of the individual structures and devices which make up a solar energy collection and utilization system will, of course, contribute to the costs, maintenance and dependability of such systems. In the single and two axis systems, the prior art tracking subsystem, i.e., the devices and components which sense the position of the sun and cause appropriate positioning of the solar energy collector, are comparatively high cost and high maintenance items.

In the early stages of the development of solar collection systems, and even some present-day systems, solar tracking was accomplished by clock and escapement mechanisms which operate through suitable gear trains.

With the development of sophisticated electronic equipment, the clock escapement type of tracking subsystems have been replaced, to a great extent by electronic systems. The electronic solar tracking subsystems normally utilize photocells in conjunction with suitable circuits for operation of collector positioning motors. In some subsystems, photoconductive cells are used and, as is well known, this type of photocell is efficient only at low temperatures and thus must be located remotely from the collector and shielded from the high temperatures of the collector. In other electronic solar tracking subsystems, photovoltaic cells are used which as known, produce a small voltage when light falls thereon. Since the voltages produced by photovoltaic cells are small and incapable of directly operating collector positioning equipment, they are used as triggering signals which operate comparatively complex circuitry, or other devices which in turn operate collector positioning equipment such as electric motors.

A typical prior art electronic solar tracking subsystem is discussed in U.S. Pat. No. 4,111,184. The prior art subsystem discussed in this Patent includes sun position sensors, such as the above described photovoltaic cells, which produce signals representative of the elevation and azimuth of the sun. A solar tracking position signal generator, comprising two potentiometers, the movable arms of which are positioned to represent the location of the collector in elevation and azimuth, produces two signals representative of the elevation and azimuth of the collector. The signals produced by the sun sensors and those produced by the signal generator are compared in subtracter devices one of which produces a difference signal that operates an elevation positioning motor, and the other of which produces a difference signal which operates an azimuth positioning motor.

It will now be seen that the prior art solar tracking subsystems are relatively delicate and sensitive structures as far as the sensors are concerned, and thus, must be protected and shielded from the damaging effects of the hostile environment in which solar systems operate. Further, those subsystems are relatively complex and therefore quite costly and require considerable maintenance.

Therefore, a need exists for a new and improved solar tracking subsystem, for use in solar collector systems, which overcomes some of the problems and shortcomings of the prior art.

SUMMARY OF THE INVENTION

In accordance with the present invention, a new and improved solar tracking subsystem is disclosed for use in solar collecting and utilization systems. The solar tracking subsystem of the present invention may be used on solar collector systems of various configurations having an azimuth frame that is rotatably drivable about a substantially vertical axis for azimuthal tracking purposes and has a collector of the reflector-concentrator type, such as a parabolic reflector, mounted for rotational driving about a substantially horizontal axis for elevational tracking purposes. The solar tracking subsystem includes a first heat sensor means which is mounted adjacent a solar energy absorber of the solar collector system in a laterally offset position which lies in the movement path of the radiation focal point produced by the parabolic reflector, with that movement path being the normal result of the sun's apparent azimuthal movement in its diurnal path. As the radiation focal point moves from the absorber toward the first heat sensor means, the temperature in the vicinity of the first heat sensor means will increase which causes actuation thereof from a first state to a second state. The first heat sensor means is electrically coupled in the power supply circuit of a reversibly drivable electric motor which is mechanically connected to drive the azimuth frame. When the first heat sensor means is in its first, or normal state, i.e., relatively cool, the power supply circuit to the azimuth drive motor is open, and the circuit will be completed when the heat sensor means is actuated to its second state. Thus, when the radiation focal point moves away from the solar energy absorber, the first heat sensor means will enable operation of the azimuth drive motor for moving the radiation focal point back so that it once again impinges on the absorber and this, of course, results in a temperature drop in the vicinity of the first heat sensor means which allows it to return to its normal state and thus interrupt power to the azimuth drive motor.

The azimuth drive motor is repeatedly operated in the above described manner throughout a day's operation of the solar collector and utilization mechanism, and such operation will move the parabolic reflector from east to west. When the diurnal cycle of the sun is completed, at sunset, a sensor means, which may be either a light sensitive or heat sensitive device, will apply power to the azimuth drive motor to operate it in the reverse direction, i.e., from west to east. Therefore, when the diurnal cycle of operation is complete, the parabolic reflector is returned to its starting position and is ready to start a subsequent diurnal cycle of operation at sunup.

The above described solar tracking subsystem forms a complete apparatus which is suitable for use on a solar collection system of the single axis solar tracking type. When the solar tracking subsystem of the present invention is to be used on a two axis solar tracking mechanism, it further includes a second heat sensor means mounted above the solar energy absorber and a third heat sensor means mounted below the absorber. The second and third heat sensor means are electrically coupled in the power circuits of a reversibly drivable electric motor which is mechanically coupled to rotatably drive the parabolic reflector about its horizontal axis. Therefore, any elevational deviations in the radiation focal point in either the up or down direction relative to the absorber will cause actuation of the appropriate one of the second or third heat sensor means and such actuation will operate the elevational drive motor in the proper direction to compensate for the elevational deviation of the radiation focal point.

The heat sensor means employed in the solar tracking subsystem of the present invention may be any of several well known devices such as a thermister, a bourdon tube device or similar structure which expands and contracts in response to temperature change. However, the preferred type of heat sensor means is a normally open bimetallic switch due to the low cost, dependability and inherent simplicity of those well known devices. One of the main advantages of a bimetallic switch over photocells, thermisters, and the like, is that they can be coupled directly into the power supply circuits of the azimuth and elevational drive motors and thus do not require the use of amplifiers or other special electronic circuitry or equipment.

Accordingly, it is an object of the present invention to provide a new and improved solar tracking subsystem for use in a solar energy collector and utilization system.

Another object of the present invention is to provide a new and improved solar tracking subsystem of relatively low cost, maximum dependability and having minimum maintenance requirements.

Another object of the present invention is to provide a new and improved solar tracking subsystem which includes a heat sensor means for sensing azimuthal movement of the sun in its apparent diurnal path and causing appropriate positioning of a solar radiation collector so that it follows the azimuthal movement of the sun.

Another object of the present invention is to provide a new and improved solar tracking subsystem of the above described character which further includes second and third heat sensor means which sense elevational deviations in the apparent diurnal path of the sun and causes elevational positioning of the solar collector to compensate for those elevational deviations.

Another object of the present invention is to provide a new and improved solar tracking subsystem of the above described type wherein the heat sensor means are electrically coupled in the power supply circuits of azimuth and elevational drive motors and are normally open devices which hold those motors inoperative at relatively low ambient temperatures and will enable motor operation at relatively higher ambient temperatures.

Still another object of the present invention is to provide a new and improved solar tracking subsystem of the above described character wherein the heat sensor means are bimetallic switches.

The foregoing and other objects of the present invention, as well as the invention itself, may be more fully understood from the following description when read in conjunction with the accompanying drawings.

DESCRIPTION OF THE PREFERRED EMBODIMENT

Figure 1:
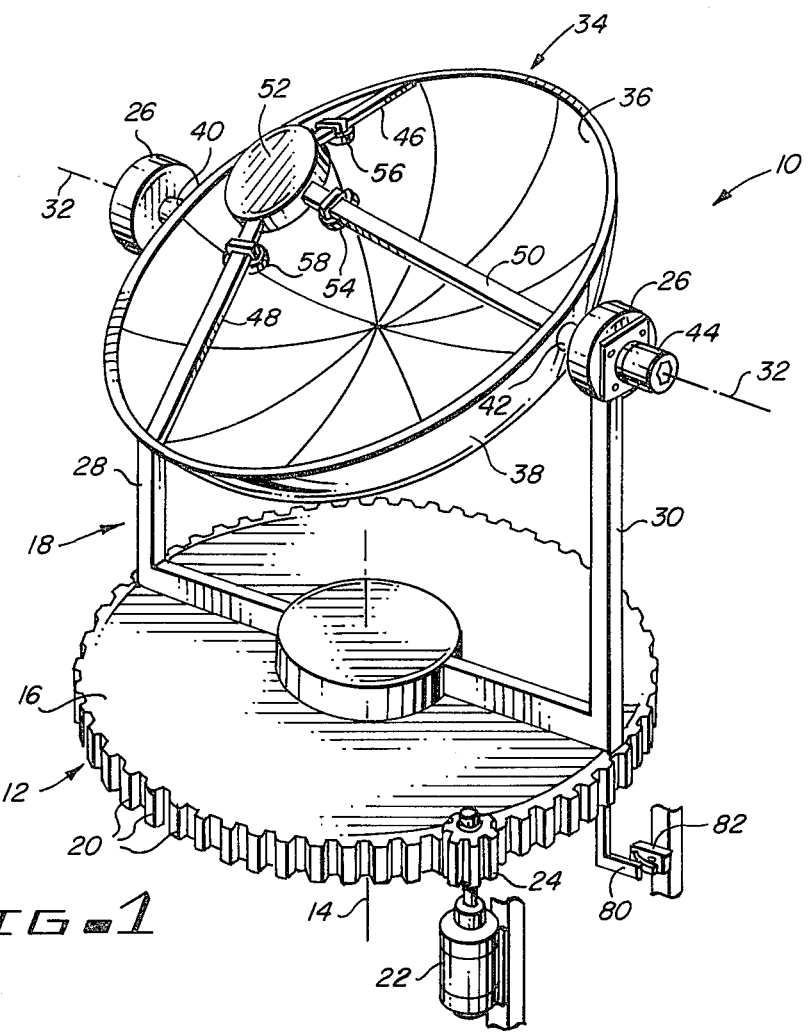
FIG. 1 is a simplified perspective view of a typical solar collector system with the solar tracking subsystem of the present invention mounted thereon.

Referring more particularly to the drawings, FIG. 1 shows a typical solar collector mechanism which is indicated generally by the reference numeral 10. The solar collector mechanism 10 is shown in simplified form in that the specific structural details thereof, or configuration differences which exist between different collectors are not to be construed as limitations of the present invention. Thus, the specifically illustrated solar collector 10 is shown only for completeness of this disclosure and to facilitate understanding of the present invention.

The solar collector 10 includes an azimuth frame 12 which is suitably mounted for rotation about a substantially vertical axis 14. The azimuth frame 12 includes a planar disc 16 which lies in a horizontal plane and has a yoke 18 extending normally from the upwardly facing surface thereof. The disc 16 is provided with suitable gear teeth 20 on its peripheral edge by which the azimuth frame 12 is rotatably moved. A reversible electric motor 22 is suitably positioned adjacent the periphery of the disc 16 and the output shaft of the motor has a pinion gear 24 fixedly mounted thereon. The pinion gear 24 is in meshed engagement with the gear teeth 20 so that the electric motor will drivingly rotate the azimuth frame 12 about the axis 14 as will hereinafter be described in detail.

The yoke 18, which is fast with the disc 16 for rotation therewith, has a suitable bearing housing 26 formed on the uppermost end of each of its spaced apart upwardly extending arms 28 and 30. The bearing housings 26 are in alignment with each other and define a substantially horizontal axis 32.

A solar radiation reflector-concentrator, in the form of a parabolic reflector 34, is formed with the usual reflective surface 36 carried in a dish-shaped housing 38. A pair of trunions 40 and 42 extend from diametrically opposed sides of the collector 34 and those trunions are journaled for rotation in the bearing housings 26 so that the collector 34 is rotatable about the horizontal axis 32. A reversible electric motor 44 is mounted on the upstanding arm 30 of the yoke 18 and is suitably coupled (not shown) to the trunion 42 of the collector. Therefore, the motor 24 will rotatably drive the parabolic reflector about the horizontal axis 32.

From the above, it should be apparent that the reversible electric motor 22 is the azimuthal positioning drive motor and the reversible electric motor 44 is the elevational positioning drive motor.

The parabolic reflector 34, or collector, is provided with three struts 46, 48 and 50 which extend from the collector 34 and converge at the principal radiation focal point of the collector. A solar energy absorber 52 is supported by the struts 46, 48 and 50 at the principal radiation focal point of the reflector, and the absorber may be any suitable structure for absorbing solar energy and transferring it to a suitable medium such as water, air, and the like.

In use, the solar radiation collector 10 is operated, as will hereinafter be described, so that the horizontal axis 32 will be kept in a perpendicular relationship with respect to the sun's rays and thus the horizontal axis may be considered as being in alignment with the apparent diurnal path of the sun. The strut 50 is positioned so that its longitudinal axis intersects the horizontal axis 32. Therefore, even though the strut 50 is not perpendicular to the sun's rays due to its specific attitude, the strut 50 will be kept in substantial alignment with the apparent diurnal path of the sun.

A first heat sensor means 54 is mounted on the strut 50 adjacent the absorber 52 so as to be laterally offset from the principal focal point of the reflector 34. The first heat sensor means 54 therefore, lies on the movement path that the focal point will follow as a natural result of the azimuthal movement of the sun. In other words, as the sun moves, the focal point will move away from the absorber 52 toward the first heat sensor means 54. Such azimuthal movement of the focal point will cause an increase in the temperature adjacent the heat sensor means 54, and when the temperature reaches a predetermined value, the sensor means will switch from a first state to a second state.

The struts 46 and 48 extend from opposite sides of the absorber 52 and are disposed so that their respective longitudinal axes are substantially transverse with respect to the longitudinal axis of the strut 50. Therefore, the strut 46 is disposed above the focal point movement path and the strut 48 is below that path.

A second heat sensor means 56 is mounted on the strut 46 adjacent the energy absorber 52, and a third heat sensor means 58 is mounted on the strut 48 adjacent the absorber. The second and third heat sensor means 57 and 58, respectively, are employed to control the elevational position of the reflector 34 and do so by controlling its rotational position about the horizontal axis 32. When the sun moves upwardly relative to the horizon, as it will do during its apparent diurnal cycle, the focal point of the reflector will move off of the absorber 52 toward the third heat sensor means 58, and in doing so will increase the temperature in the vicinity of the sensor 58. When this rising temperature reaches a predetermined value, the third heat sensor means 58 will switch from a first state to a second state. Likewise, when the sun moves downwardly relative to the horizon, the focal point of the reflector 34 will move toward the second heat sensor means 56 and cause it to switch from a first state to a second state when the temperature in the vicinity of the sensor 56 reaches a predetermined value.

As hereinbefore mentioned, the heat sensor means 54, 56 and 58, may be any of several well known heat sensitive devices, with the preferred device being a bimetallic switch. As is well known, a bimetallic switch is simply pieces of metal welded together with the pieces of metal having different coefficients of thermal expansion. When heated, the metal will deform, such as from a linear to an arcuate configuration and this deformation is used to make and break an electric circuit. The specific heat sensor means 54, 56 and 58 are normally open in their first states, with their second states, being, of course, closed.

The heat sensor means 54, 56 and 58 can be mounted on their respective struts 50, 46 and 48 in any suitable manner and may be shielded in a suitable manner from the direct rays of the sun to prevent the extremely high temperatures from damaging the sensors.

Figure 2:
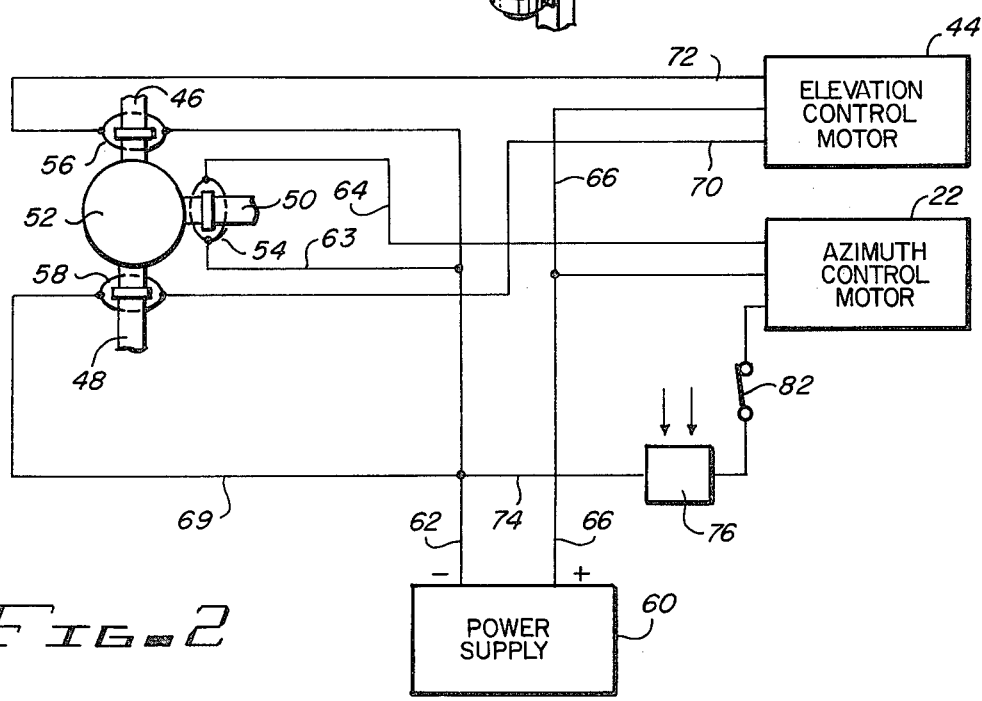
FIG. 2 is an electric wiring diagram in schematic form relating to the solar tracking subsystem of the present invention.

Referring now to FIG. 2 wherein the electrical interconnections of the solar tracking subsystem of the present invention are shown. A suitable power supply 60 such as a domestic 110 volt AC source, a storage battery, and the like, has a first conductor 62 which is connected by means of conductor 63 to one terminal of the heat sensor means 54. The other terminal of the sensor 54 is coupled by a conductor 64 to the azimuth control motor 22. The power supply 60 has a second conductor 66 which is coupled to the azimuth control motor 22 by conductor 67. The conductors 62, 63, 64 and the conductors 66 and 67 form a complete circuit for driving the azimuth motor 22 in one direction and that circuit is open when the first heat sensor means 54 is in its first, or normally open, state, and the circuit will be closed to drive the azimuth motor 22 when the first heat sensor means 54 moves to its second state.

The first conductor 62 is connected, by means of the conductor 69 to one terminal of the third heat sensor means 58, the other terminal of which is connected to the elevation control motor 44 by means of conductor 70, and the second conductor 66 of the power supply is connected directly to the elevational control motor 44. Thus, the conductors 62, 69, and 70 and the conductor 66 form a complete circuit for driving the elevation control motor 44 in one direction, and this circuit is open when the third heat sensor means 58 is in its first or normally open state.

The first conductor 62 from the power supply 60 is connected directly to one terminal of the second heat sensor means 56 and the other terminal thereof is connected by a conductor 72 to the elevation control motor 44. Thus, the conductors 62, 72 and the conductor 66 form a complete circuit for driving the elevational control motor 44 in the opposite direction, and this circuit is open when the second heat sensor means 56 is in its first, or normally open state.

The first conductor 62 of the power supply 60 is coupled to the azimuth control motor 22 by a conductor 74 in which a normally open sensor means 76 is mounted. As hereinbefore mentioned, the azimuth control motor 22 is driven in one direction by the circuit which includes the conductors 62, 63, 64, 66 and 67 in which the first heat sensor means 54 is mounted. The azimuth control motor is driven in the opposite direction by the circuit which includes the conductors 62, 74, 66 and 67 in which the sensor means 76 is mounted. The sensor means 76 is a two state device, the first state of which is normally open, and the second state of which is closed. The sensor means 76 is preferably a light sensitive device which is in its first state when light is impinging thereon and will move to its second state in the absence of light.

With the solar collector mechanism 10, having the solar tracking subsystem of the present invention mounted thereon, facing in an easterly direction to catch the rays of the rising sun, the heat sensors 54, 56 and 58 will appropriately and periodically operate the azimuth and elevational control motors 22 and 24 to cause the reflector 34 to track the apparent diurnal path of the sun. Upon completion of the diurnal solar cycle, at sunset, the reflector will be facing west and must be returned to its easterly facing direction in preparation for a subsequent diurnal cycle of the sun. This return function is accomplished by the light sensor means 76 which will move to its second, or closed, state when the sun sets. Such closing of the sensor means 76 operates the azimuthal control motor 44 in its opposite direction as hereinbefore described and thus returns the reflector to its starting position. The azimuth frame 12 is provided with an extending arm 80 which moves into contact with a normally closed limit switch 82 that is mounted in the conductor 74 and that limit switch will interrupt operation of the azimuth control motor 22 when the reflector 34 reaches its starting position.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A sun tracking solar energy collector comprising:
   (a) an azimuth frame mounted for rotation about a vertical axis;
   (b) a first reversible motor coupled to rotatably drive said azimuth frame;
   (c) frame means on said azimuth frame for rotation therewith, said frame means defining a horizontal axis;
   (d) a reflector carried on said frame means for rotation about the horizontal axis, said reflector adapted to reflectingly concentrate solar radiation into a focal point;
   (e) a second reversible motor coupled to rotatably drive said reflector about the horizontal axis;
   (f) a solar energy absorber mounted at the principal radiation focal point produced by said reflector;
   (g) a first heat sensor means proximate and laterally spaced from said absorber and coupled to said first motor, said first heat sensor means for sensing the heat present at the radiation focal point to detect movement of the radiation focal point away from said absorber as a result of the azimuthal movement of the sun and responding thereto by enabling operation of said first motor to drive said azimuth frame and thereby said reflector in one direction an amount necessary to move the focal point back onto said absorber;
   (h) second and third heat sensor means coupled to said second motor proximate and spacedly mounted on opposite sides of said absorber for sensing the heat present at the radiation focal point to detect movements of the radiation focal point away from said absorber due to elevational changes in the sun's movement path and responding thereto by enabling operation of said second motor to drive said reflector in the direction and in the amount needed to move the radiation focal point back onto said absorber; and
   (i) sensor means in the form of a light sensitive device in the circuit which supplies power for operating said first reversible motor in the opposite direction, said sensor means having a first state which opens the circuit in which it is mounted upon sensing the presence of light and having a second state which completes that circuit when the absence of light is sensed upon completion of the diurnal cycles to enable said first reversible motor to drive said azimuth frame and thereby said reflector to a position which faces the starting point of subsequent diurnal cycles of the sun.

2. A sun tracking solar energy collector as claimed in claim 1 and further comprising:
   (a) said first heat sensor means is in the circuit which supplies power to operate said first motor in one direction and has a first state which opens the circuit in which it is mounted when the sensed temperature is below a predetermined value and has a second state which completes that circuit when the sensed temperature is above a predetermined value;
(b) said second heat sensor means is in the circuit which supplies power to operate said second motor in one direction and has a first state which opens the circuit in which it is mounted when the sensed temperature is below a predetermined value and has a second state which completes that circuit when the sensed temperature is above a predetermined value; and
(c) said third heat sensor means is in the circuit which supplies power to operate said second motor in the opposite direction and has a first state which opens the circuit in which it is mounted when the sensed temperature is below a predetermined value and has a second state which completes that circuit when the sensed temperature is above a predetermined value.

3. A sun tracking solar energy collector as claimed in claim 2 wherein said first, said second and said third heat sensor means are each a normally open bimetallic switch.

4. A sun tracking solar energy collector as claimed in claim 1 and further comprising means for interrupting operation of said first motor in the opposite direction when said reflector reaches a position where it is facing the starting point of subsequent diurnal cycles of the sun.

* * * * *